3,288,792
METHOD OF PREPARING 2,4-DIAMINO-6-
ALKYLPYRIDO(2,3-d)PYRIMIDINES
George H. Hitchings, Yonkers, and Bernard S. Hurlbert,
Tarrytown, N.Y., assignors to Burroughs Wellcome &
Co. (U.S.A.) Inc., Tuckahoe, N.Y., a corporation of
New York
No Drawing. Filed Apr. 9, 1964, Ser. No. 358,657
2 Claims. (Cl. 260—256.4)

This application is a continuation-in-part of Serial No. 207,798 filed July 5, 1962.

This invention relates to pyrido(2,3-d)pyrimidines and their production. The numbering of this ring system is shown in the following formula:

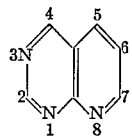

The invention comprises the new 2,4-diaminopyrido-(2,3-d)pyrimidines of Formula I and a method for producing them.

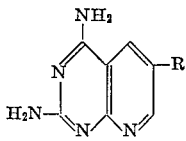

(I)

In this formula, R is an optionally substituted hydrocarbon radical, and may for example be a straight or branched alkyl group having preferably from 3 to 5 carbon atoms or a phenalkyl or phenyl group optionally bearing one or more substituents such as alkyl or alkoxy groups or halogen atoms.

The 2,4-diaminopyrido(2,3-d)pyrimidines of Formula I may be produced by treating a 3-(tertiary amino)acrolein of Formula II in the cold with a halogenating agent such as phosgene, phosphoryl chloride or thionyl chloride, heating the halogenated derivative with 2,4,6-triaminopyrimidine, and isolating the desired 2,4-diaminopyrido(2,3-d)pyrimidine of Formula I from the reaction mixture.

(II)

In Formula II, R is as defined above and ABN is a tertiary amino group, conveniently a dimethylamino group although groups such as diethylamino, pyrrolidino or N-methylanilino groups are possible. The tertiary amino group ABN is eliminated during the condensation with 2,4,6-triaminopyrimidine and does not appear in the product of Formula I, so its precise identity is of little importance provided that the reagent of Formula II and its halogenated derivative are suitably reactive. The initial reaction of the compound II with phosgene or the like is conducted conveniently in an inert solvent such as a relatively low-boiling halogenated hydrocarbon. Chloroform, methylene chloride and the dichloroethanes are satisfactory. This solvent is largely removed before addition of the triaminopyrimidine. This latter is added in an anhydrous solvent capable of dissolving it. Such solvents are the lower alcohols.

The 3-(tertiary amino)acroleins of Formula II are chemically related to malonic dialdehydes, but have a great advantage over the free dialdehydes in stability, with resultant higher yields of the 2,4-diaminopyrido-(2,3-d)-pyrimidines of Formula I.

The new 2,4-diaminopyrido(2,3-d)pyrimidines of Formula I have been found to be active antibacterial agents, with chemotherapeutic indices differing from and in certain respects superior to those of the 2,4-diaminopyrido-(2,3-d)-pyrimidines previously described. The published compounds have substituents at either or both of positions 5 and 7, and optionally also at position 6; the compounds of the present invention substituted at position 6 but at neither position 5 nor 7 were unattainable by the methods previously described.

It is believed that all 2,4-diaminopyrimidine derivatives are inhibitors of folic (dihydrofolic) acid reductase. Minor chemical changes in critical regions of the inhibitor molecule appear to produce striking alterations in the binding to specific reductases. Thus, the diaminopyrido-pyrimidines in general are only loosely bound to reductases from mammalian sources and have relatively low toxicities in mammals, but are highly active against certain bacteria. The 5-unsubstituted compounds of the present application are particularly active in inhibiting staphylococci and streptococci and are less active than 5-methyl derivatives against *Proteus* and *Escherichia coli*. Each type of derivative therefore has a particular field of usefulness.

The compounds of the present application may be used topically as antibacterial agents. They also show chemotherapeutic effectiveness in trials in experimental infections in mice. They are particularly valuable for their ability to potentiate the action of sulfonamides, in both topical and chemotherapeutic applications. They also have significant activity in experimental infections with plasmodia (malaria).

These pyridopyrimidines may be employed as free bases or as salts. In some cases the hydrochlorides are rather insoluble and use of sulfates, malates, acetates and in particular, isethionates is desirable. Certain of the isethionates have the peculiar property of crystallizing as basic salts: $B_2 \cdot HOCH_2CH_2SO_3H$ which appear to be discrete entities although a theoretical formulation is not obvious.

This invention in another aspect provides pharmaceutical formulations comprising a 2,4-diaminopyrido(2,3-d)-pyrimidine of Formula I. The compound may advantageously be presented in discrete units, such as tablets, capsules, cachets, ampoules or suppositories, each containing a predetermined amount of the compound. It may also be presented as a powder or granules, as a solution or suspension in an aqueous, non-aqueous or emulsified liquid, or as an ointment. For parenteral use, the formulations of this invention may be made by any of the methods of pharmacy, and may include one or more of the following accessory ingredients: diluents, solutes, buffers, flavoring, binding, dispersing, surface-active, thickening, lubricating and coating materials, preservatives, antioxidants, bacteriostats, suppository and ointment bases, and any other acceptable excipients.

The 2,4-diaminopyrido(2,3-d)pyrimidines of Formula I may be used topically in lotions and ointments in concentrations of 0.1–1% to inhibit bacterial growth. In addition, they potentiate the antimicrobial activity of the sulphanilamides and so may be used in combination with the latter to enhance their effectiveness.

The following examples illustrate the invention. Temperatures are in degrees Celsius.

EXAMPLE 1

1.85 g. phosgene (0.0187 mole) in 20 ml. chloroform was added slowly with cooling in an ice bath to a solution of 2.9 g. 3-dimethylamino-2-isobutylacrolein (0.0187 mole) in 20 ml. chloroform. The reaction mixture was concentrated on a steam bath until most of the chloroform was removed. 2.34 g. 2,4,6-triaminopyrimidine (0.0187 mole) and 50 ml. absolute alcohol were added, and the mixture was heated under reflux for 24 hours. It was then cooled and filtered, and the precipitate was recrystallized from 50% ethanol-water to yield 2,4-diamino-6-isobutylpyrido(2,3-d)pyrimidine hydrochloride dihydrate. (Found: N, 24.19; Cl, 12.4%. $C_{11}H_{15}N_5 \cdot HCl \cdot 2H_2O$ requires N, 24.17; Cl, 12.24%). This salt was dehydrated at 50° in vacuo to give 1.95 g. anhydrous salt, M.P. 286° (decomp.). (Found: C, 57.39; H, 6.70%. $C_{11}H_{15}N_5 \cdot HCl$ requires C, 52.07; H, 6.36%.)

EXAMPLE 2

A solution of 5.8 g. phosgene (0.059 mole) in 30 ml. chloroform was added to a solution of 8.9 g. 2-butyl-3-dimethylaminoacrolein (0.0575 mole) in 30 ml. chloroform with cooling. This solution was concentrated on a steam bath to remove most of the chloroform. 7.2 g. 2,4,6-triaminopyrimidine (0.0576 mole) and 50 ml. ethanol were added and the mixture was heated under reflux for 18 hours. It was then acidified with concentrated hydrochloric acid, 20 ml. water was added, and the mixture was evaporated almost dry. The solid was filtered off, washed with a small amount of 50% ethanol and recrystallized from 80% ethanol to yield 11.5 g. 2,4-diamino-6-butylpyrido(2,3-d)pyrimidine hydrochloride, M.P. 278° (decomp.). (Found: C, 52.26; H, 6.57; N, 27.43%.

requires C, 52.07; H, 6.36; N, 27.60%.)

The isethionic acid salt of 2,4-diamino-6-butylpyrido-(2,3-d)pyrimidine was prepared. The hydrochloride salt was stirred in aqueous sodium hydroxide for 3 hours. The free base thus liberated was filtered from the aqueous solution, washed with water, and recrystallized from aqueous ethanol containing an equivalent of isethionic acid. Further recrystallizations were from aqueous ethanol.

The isethionate salt could also be obtained by basifying the reaction mixture obtained in Example 2 (column 3, lines 24–27) with sodium methoxide, filtering off the solids, washing with water, and recrystallizing from aqueous ethanol containing isethionic acid. (Calculated: C, 44.94; H, 6.09; N, 20.20. Found: C, 45.66; H, 6.45; N, 20.32.)

EXAMPLE 3

8.3 g. 2,4-diamino-6-propylpyrido(2,3-d)pyrimidine hydrochloride hemihydrate, M.P. 275° (decomp.), was prepared from 9.9 g. phosgene (0.10 mole), 14.1 g. 3-dimethylamino-2-propylacrolein (0.10 mole) and 12.5 g. 2,4,6-triaminopyrimidine (0.10 mole) by the procedure described in Example 2. (Found: C, 48.73; H, 5.83; N, 27.85%. $C_{10}H_{13}N_5 \cdot HCl \cdot \frac{1}{2}H_2O$ requires C, 48.29; H, 6.08; N, 28.16%.) 2,4-diamino-6-propylpyrido (2,3-d)-pyrimidine isethionate salt. (Calculated: C, 43.23; H, 5.74; N, 21.01. Found: C, 43.57; 43.40; H, 5.84; 6.06; N, 20.99.)

EXAMPLE 4

2,4-diamino-6-hexylpyrido(2,3-d)pyrimidine hydrochloride, M.P. 262° (decomp.), was prepared from 3-dimethylamino-2-hexylacrolein by the procedure described in Example 2. (Found: C, 53.73; H, 7.72; N, 24.25%. $C_{13}H_{19}N_5 \cdot HCl$ requires C, 55.40; H, 7.16; N, 24.85%.) 2,4-diamino-6-hexylpyrido(2,3-d)pyrimidine isethionate salt. (Calculated: C, 48.50; H, 6.78; N, 18.86. Found: C, 48.78; H, 6.49; N, 19.19.)

2,4-diamino-6-hexylpyrido(2,3-d)pyrimidine salt with one-half equivalent of isethionic acid. (Calculated: C, 54.52; H, 7.19; N, 22.71. Found: C, 54.26; H, 7.48; N, 22.36.)

EXAMPLE 5

2,4-diamino-6-nonylpyrido(2.3-d)pyrimidine hydrochloride, M.P. 265° (decomp.), was prepared from 3-dimethylamino-2-nonylacrolein by the procedure described in Example 2. (Found: C, 58.85; H, 8.59; N, 21.64%. $C_{16}H_{25}N_5 \cdot HCl$ requires C, 59.33; H, 8.09; N, 21.63%.)

2,4-diamino-6-nonylpyrido(2,3-d)pyrimidine isethionate salt. (Calculated: C, 52.27; H, 7.86; N, 16.94. Found: C, 52.98; H, 7.85; N, 16.67.)

2,4-diamino-6-nonylpyrido(2,3-d)pyrimidine salt with one-half equivalent of isethionic acid. (Calculated: C, 58.40; H, 8.03; N, 19.92. Found: C, 58.41; H, 7.96; N, 19.57.)

EXAMPLE 6

2,4-diamino - 6 - benzylpyrido(2,3-d)pyrimidine hydrochloride, M.P. 324° (decomp.), was prepared from 2-benzyl-3-dimethylaminocrolein by the procedure described in Example 2, and recrystallized from 80% ethanol. (Found: C, 58.72; H, 4.98; N, 24.11%. $C_{14}H_{13}N_5 \cdot HCl$ requires C, 58.44; H, 4.90; N, 24.34%.)

EXAMPLE 7

2,4 - diamino - 6 - phenylpyrido(2,3-d)pyrimidine, M.P. 385–386°, was prepared from 3-dimethylamino-2-phenylacrolein by the procedure described in Example 2. The hydrochloride salt of this base was insoluble in most common solvents; it was dissolved in glacial acetic acid and the resulting acetate salt was crystallized and then sublimed to yield the free base.

2,4-diamino - 6 - phenylpyrido(2,3-d)pyrimidine isethionate hydrate. (Calculated: C, 47.23; H, 5.02; N, 18.36. Found: C, 47.47; 47.12; N, 5.08; 4.97; N, 18.46; 18.57.)

EXAMPLE 8

2,4-diamino - 6 - pentylpyrido(2,3-d)pyrimidine isethionate salt. (Calculated: C, 48.34; H, 6.30; N, 19.60. Found: C, 47.04; H, 6.48; N, 19.89.)

EXAMPLE 9

2,4-diamino-6 - phenylpyrido(2,3-d)pyrimidine isethionate hydrate. (Calculated: C, 49.87; H, 5.66; N, 17.11. Found: C, 49.87; H, 5.62; N, 17.60.)

The products of Examples 1 to 6 dissolved in pH 1 buffer have characteristic ultraviolet absorption maxima at 222 m$\mu$ and 320 m$\mu$ with a shoulder at 330 m$\mu$. The product of Example 7 in the same buffer shows maxima at 333 m$\mu$ and 252 m$\mu$.

EXAMPLE 10

1.21 g. of 2,4-diamino-6-(p-methoxybenzyl)pyrido(2,3-d)pyrimidine basic isethionate monohydrate, M.P. 280–5° C., was prepared from 6.48 g. of 2-(p-methoxybenzyl)-3-dimethylaminoacrolein, 2.92 g. of phosgene, and 3.69 g. of 2,4,6-triaminopyrimidine by the usual procedure followed by recrystallization from ethanol containing an equivalent amount of isethionic acid.

EXAMPLE 11

2.04 g. 2,4-diamino-6-(p-methylbenzyl)pyrido(2,3-d)-pyrimidine basic isethionate salt, M.P. 286–9° C., was prepared from 9.0 g. (0.044 mole) of 2-(p-methylbenzyl)-3-dimethylamino acrolein, 5.53 g. (0.044 mole) of 2,4,6-triaminopyrimidine, and 4.4 g. (0.044 mole) of phosgene as above.

What we claim is:

1. The method of preparing 2,4-diamino-6-R-5,7-unsubstituted pyrido(2,3-d)pyrimidines that comprises reacting under anhydrous conditions a 3-tertiary amino-2-R-acrolein with a reagent selected from the class consisting of phosgene, phosphoryl chloride and thionyl chloride initially in the cold and thereafter warming the reaction mixture with 2,4,6-triaminopyrimidine at temperatures not exceeding 100° C., R being selected from a class consisting of alkyl, phenyl, phenyl lower alkyl and lower alkoxy benzyl, and wherein R is from 3 to 9 atoms.

2. The method of preparing 2,4-diamino-6-R-5,7-unsubstituted pyrido(2,3-d)pyrimidines that comprises reacting under anhydrous conditions a 3-tertiary amino-2-R-acrolein with phosgene initially in the cold and thereafter warming the reaction mixture with 2,4,6-triaminopyrimidine at temperatures not exceeding 100° C., R being selected from a class consisting of alkyl, phenyl, phenyl lower alkyl and lower alkoxy benzyl, and wherein R is from 3 to 9 atoms.

References Cited by the Examiner

FOREIGN PATENTS 1,040,040 10/1958 Germany.
829,276 3/1960 Great Britain.

OTHER REFERENCES

Cram et al., Organic Chemistry, McGraw-Hill Book Co., Inc., New York, 1959, page 270.

ALEX MAZEL, *Primary Examiner.*

HENRY R. JILES, *Examiner.*

MARY U. O'BRIEN, *Assistant Examiner.*